United States Patent
Davis et al.

(10) Patent No.: US 11,216,872 B1
(45) Date of Patent: Jan. 4, 2022

(54) METHOD AND SYSTEM FOR IMPLEMENTING A TECHNICAL IN INTERMEDIARY TOOL FOR CREDIT SERVICES

(71) Applicant: JPMorgan Chase Bank, N.A., New York, NY (US)

(72) Inventors: Michael S. Davis, Galena, OH (US); Allen M. Butler, Columbus, OH (US)

(73) Assignee: JPMorgan Chase Bank, N.A., New York, NY (US)

(*) Notice: Subject to any disclaimer, the term of this patent is extended or adjusted under 35 U.S.C. 154(b) by 622 days.

(21) Appl. No.: 15/339,273

(22) Filed: Oct. 31, 2016

Related U.S. Application Data (60) Provisional application No. 62/248,501, filed on Oct. 30, 2015.

(51) Int. Cl.
   *G06Q 10/06* (2012.01)
   *G06Q 40/02* (2012.01)

(52) U.S. Cl.
   CPC ..... *G06Q 40/025* (2013.01); *G06Q 10/06395* (2013.01)

(58) Field of Classification Search
   None
   See application file for complete search history.

(56) References Cited

U.S. PATENT DOCUMENTS

| | | | |
|---|---|---|---|
| 2004/0049452 A1* | 3/2004 | Blagg | G06Q 20/04 705/39 |
| 2006/0206418 A1* | 9/2006 | Byrne | G06Q 20/40 705/39 |
| 2011/0166988 A1* | 7/2011 | Coulter | G06Q 40/02 705/38 |
| 2011/0270727 A1* | 11/2011 | Kasower | G06F 16/9558 705/35 |

(Continued)

FOREIGN PATENT DOCUMENTS

CN   104376492 A   *   2/2015

OTHER PUBLICATIONS

E-Oscar. Accessed at https://web.archive.Org/web/20140329184753/ https://www.e-oscar.org/Accessed on Mar. 6, 19 (Year: 2014).*

(Continued)

*Primary Examiner* — Patricia H Munson
*Assistant Examiner* — Nancy N Prasad
(74) *Attorney, Agent, or Firm* — Hunton Andrews Kurth LLP (57) ABSTRACT

According to an embodiment of the present invention, an automated computer implemented system and method observes a user's actions in real-time and provides error checking and business intelligence. The system comprises a computer processor programmed to: generate, via the rules engine, a rule pack specific to a line of business, the rule pack comprising one or more rules; receive, via the interface, user interaction data in real-time, as a user interacts with the interface; apply, via the rules engine, the rule pack (Continued)

to the user interaction data; automatically identify at least one error in the user interaction data to address errors in credit disputes reporting; and generate a message responsive to the at least one error, the message displayed on the interface.

20 Claims, 8 Drawing Sheets

(56) References Cited

U.S. PATENT DOCUMENTS

2014/0074689 A1* 3/2014 Lund .................... G06Q 40/025
705/38

OTHER PUBLICATIONS

E-Oscar. Accessed at https://web.archive.Org/web/20140329184753/ https://www.e-oscar.org/ Accessed on Mar. 6, 19 (previously attached) (Year: 2014).*

E-Oscar. Accessed at https://web.archive.org/web/20140329184753/ https://www.e-oscar.org/ Accessed on Mar. 6, 2019 (previously attached) (Year: 2014).*

Carbajo, Marco. A Brief Guide to Fixing an Incomplete Outdated or Incorrect Credit Report. SBA.gov. Nov. 9, 2016. https://www.sba.gov/blog/brief-guide-fixing-incomplete-outdated-or-incorrect-credit-report (Year: 2016).*

* cited by examiner

Manage Rules
Select RulePack

Auto Finance RulePack - 235    510    Manage RulePacks

Select Page

ACDV – Account Information    512

Account Status – Scheduled Payments    514

Actual Payment - INFO    516

Balances – 0 for Balance and Past Due    518

BK File Date – Does not equal DOAI*    520

Rule Name: BK File Date – Does not equal DOAI*    522
Rule Message: The Bankruptcy File Date should match the Date of Account    524
Rule Level: Issue    526

| Field 530 | Rule Operation 532 | Field or Value(s) 534 | Operator 536 |
|---|---|---|---|
| ☐ Consumer Information Indicator | Multiple Values | A,B,C,D | And |
| ☐ < Bank File_Date | ≠ Another Field | Date of Account Information | And |
| ☐ Account Status | ≠ Multiple Values | 11,71,78,80,82,83,84,97 | And |

Edit Rule

BK File DT – Bankruptcy DT after Closed    540

CCC – Compliance Condition Code - INFO    542

CCC – Should be Blank, XR or Legal    544

Figure 5

| Field Name – short description | |
|---|---|
| Rule Name: | Field Name – short description  610 |
| Rule Message: | Additional detail for analyst to read and understand the rule  612 |
| Rule Level: | Issue  614 ▸ |

| Field  616 | Rule Operation  618 | Field or Value(s)  620 | Operator  622 |
|---|---|---|---|
| Date Closed ▸ | != ▸ | Another Field ▸ Date of Account Information ▸ | And ▸ |

☐ Add Row

Delete Row    Save Rule    Cancel    Delete Rule

☐ Rules Triggered

Rules Triggered Summary
Please review these rules and take the appropriate action if you feel they are applicable Issue History Grid – Payment History Before Open Date – Payment History is reporting prior to the Open Date

METHOD AND SYSTEM FOR IMPLEMENTING A TECHNICAL IN INTERMEDIARY TOOL FOR CREDIT SERVICES

CROSS REFERENCE TO RELATED APPLICATIONS

The application claims priority to U.S. Provisional Application 62/248,501, filed Oct. 30, 2015, the contents of which are incorporated herein in its entirety.

FIELD OF THE INVENTION

The present invention generally relates to a technical intermediary tool that interfaces with a reporting system to identify errors in real-time when providing information to credit services. The present invention also provides field and rule management and process validations.

BACKGROUND OF THE INVENTION

Currently, the government mandates how financial institutions report and resolve Credit Bureau disputes. Financial institutions are required to use a third party product for such reporting but cannot apply business rules, practices or controls. The credit industry is complicated with constant updates and changes. Without the ability to apply controls, clients are not protected when upstream processes change and impact credit report data.

These and other drawbacks exist.

SUMMARY OF THE INVENTION

Accordingly, one aspect of the invention is to address one or more of the drawbacks set forth above. According to an embodiment of the present invention, a computer implemented system observes a user's actions in real-time and provides error checking and business intelligence. The system comprises: an interface that communicates with a third-party reporting system that processes credit disputes; a rules engine comprising a memory component that stores rules data specific to credit businesses; and a computer processor coupled to the interface, rules engine, memory component; the computer processor programmed to: generate, via the rules engine, a rule pack specific to a line of business, the rule pack comprising one or more rules; receive, via the interface, user interaction data in real-time, as a user interacts with the interface; apply, via the rules engine, the rule pack to the user interaction data; automatically identify at least one error in the user interaction data to address errors in credit disputes reporting; and generate a message responsive to the at least one error, the message displayed on the interface.

According to another embodiment of the present invention, an automated computer implemented method comprising the steps of: generating, via a rules engine, a rule pack specific to a line of business, the rule pack comprising one or more rules; receiving, via an interface, user interaction data in real-time, as a user interacts with the interface; applying, via the rules engine, the rule pack to the user interaction data; automatically identifying at least one error in the user interaction data to address errors in credit disputes reporting; and generating a message responsive to the at least one error, the message displayed on the interface.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DESCRIPTION OF EMBODIMENTS OF THE INVENTION

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

In some industries, participants are required to use a particular reporting system to report and resolve certain disputes. Oftentimes, such reporting systems have significant drawbacks in terms of correcting data entry errors and providing automated assistance with business rules. In the financial industry, an exemplary reporting system may include eOscar, which stands for Online Solution for Complete and Accurate Reporting. eOscar is a browser-based, compliant system developed by credit bureaus. e-OSCAR-web was designed to provide an online solution for processing automated credit dispute verifications (ACDVs) and automated universal data forms (AUDs).

An embodiment of the present invention is directed to a technical intermediary tool that interfaces with a reporting system. According to an embodiment of the present invention, the innovative intermediary tool may include (1) an interface that observes a user's actions in real-time and provides error checking and business intelligence based on specific business rules, and (2) a Management Portal that manages a rules engine. The rules engine provides input in real-time to the interface, where business-specific rules may be controlled and changed by each business (e.g., Mortgage, Credit Card, Auto, Student Loan, etc.). According to an exemplary application, the innovative system may be applied to the eOscar system. The innovative system may be applied to other reporting systems, third party systems, as well as other industries, services and applications.

An embodiment of the present invention is directed to a custom software package that allows users to execute custom business rules, new validations and check and balances in real-time when amending a customer application (e.g., a customer's credit record, etc.) using a third party website. These rules may be driven and managed by a unique rules engine management software package. An embodiment of the present invention is directed to an innovative platform that monitors and notifies specialists and other users about issues while they are performing their tasks. The system applies a particular set of rules, logic and/or controls to ensure a high level of data quality delivered, which may be provided to various receiving entities, such as one or more Credit Bureaus.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Figure 1:
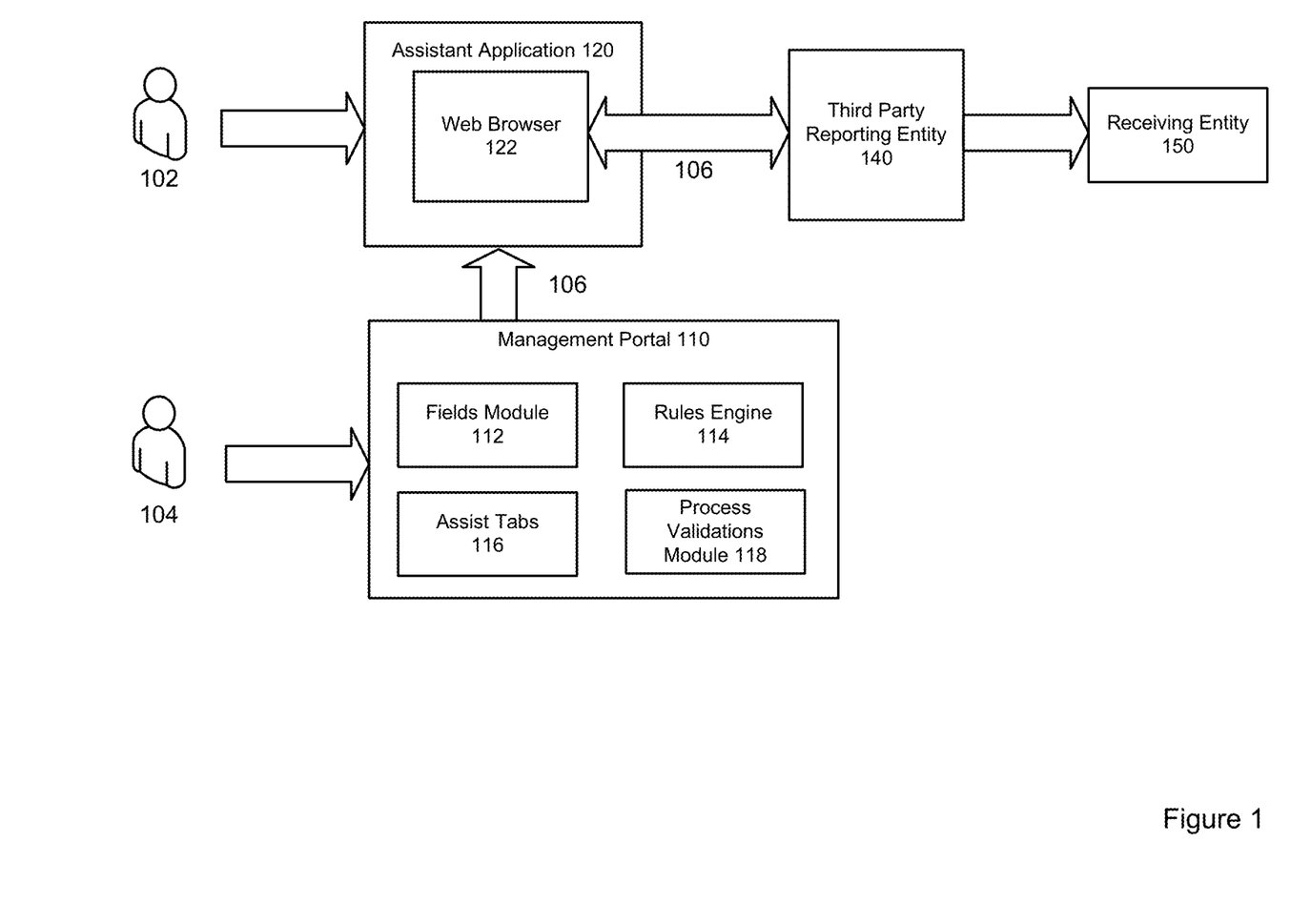
FIG. 1 is an exemplary system diagram, according to an embodiment of the present invention.

FIG. 1 is an exemplary system diagram, according to an embodiment of the present invention. As shown, FIG. 1 includes an Assistant Application 120, which may be written in .NET or other format/language. This exemplary application may embed a Web Browser 122 instance which may be monitored and controlled in real-time. Accordingly, the application may manipulate HTML/interfaces in real-time based on Rules and Data points. Assistant Application 120 may be hosted on various devices, such as a desktop computer, laptop, mobile device, smartphone, tablet, wearable and/or other user device with a processor or other computing component. User 102 may interact with Assistant Application 120. According to an exemplary scenario, user 102 may include a specialist processing credit disputes.

User 102 may communicate with a Third Party Reporting Entity 140, which then communicates to a Receiving Entity 150. According to an exemplary scenario, Third Party Reporting Entity 140 may represent a credit reporting service or website, such as OSCAR, and Receiving Entity may represent a Credit Bureau, such as TransUnion, Innovis, Experian and Equifax.

An embodiment of the present invention is directed to a technical intermediary tool that interfaces between specialists and the third party website so that processes and controls may be injected into the website as well as identify illogical conditions based on internal business practices. The intermediary tool may execute a set of rules which may be defined, managed and maintained by a management team. The rules may represent a direct impact of quality results from QA teams to address and impact highest offending issues. Because any mistake which is sent out has a direct and immediate impact on clients, an embodiment of the present invention applies controls to protect consumers, thereby providing a new type of standard for credit reporting.

FIG. 1 also illustrates a Management Portal, as shown by 110, that communicates with Assistant Application 120, via a network 106. As shown in FIG. 1, User 104 may interact with Management Portal 110. Management Portal 110 may communicate with Assistant Application 120 via an XML Web Service which may feed the Desktop Client. Other forms of communication may be implemented. Network 106 may be communicatively coupled with one or more data devices including, for example, computing devices. Such devices may include mobile devices, including desktop computers, laptops, mobile phones, smart devices, etc.

Management Portal 110 may include various functions and processors, as represented by Fields Module 112, Rules Engine 114, Assist Tabs 116 and Process Validations Module 118. Other functionality may be provided by Management Portal 110.

Fields Module 112 may include a field definitions interface, which contains a list of all fields currently available in a third party website. For example, each row may display an identifier, name and description of the field. Users may have the ability to edit the name and description of fields. Users may modify the field as well as add and remove fields. To modify a field, a user may access a Field Definitions tab and select an appropriate Rulepack and Page to view the corresponding list of fields. The user may identify the field requiring update and perform an edit.

To add or remove fields from the application, the system may require a work request to be submitted. For example, a user may select Mortgage Banking and Servicing for "Authorizing Line of Business" and "Authorizing Business Unit." The user may complete the work request form as a Regulatory Regulatory Compliance Request and include details on the field(s) to add or remove in the title and description interfaces.

Rules Engine 114 may manage rules that execute via Assistant Application 120. The rules may be controlled and changed by various businesses, for example, and propagated to the clients in real-time. A Rulepack may represent a set of validations that applies to specific business processing within the Application. Certain field selections and values entered may trigger an issue, warning or informational message to display with the intention of prompting a user (e.g., analyst) to check the work and ensure accuracy.

Assist Tabs 116 may provide user (e.g., analyst) with rule and field selection details, helpful links to other applications, preference options within the application and the ability to change or refresh a Rulepack. For example, Assist Tabs may include a Home tab, Tools and Settings tab and an About tab.

Process Validations Module 118 may represent rules validating data as automated credit dispute verifications (ACDVs) and automated universal data forms (AUDs) are being processed. For example, there may not be a rule for every field or every process and the validations may not replace any part of the research and work required for an account. Accordingly, an embodiment of the present invention is directed to identify common and high impacting violations.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. The system 100 described below may be used to implement the various methods herein, by way of example. Various elements of the system 100 may be referenced in explaining the exemplary methods described herein.

The network 106 may be a wireless network, a wired network or any combination of wireless network and wired network. For example, the network 106 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, the network 106 may support an Internet network, a wireless communication network, a cellular network, Bluetooth, or the like, or any combination thereof. The network 106 may further include one, or any number of the exemplary types of networks mentioned above operating as a stand-alone network or in cooperation with each other. The network 106 may utilize one or more protocols of one or more network elements to which it is communicatively coupled. The network 106 may translate to or from other protocols to one or more protocols of network devices. Although the network 106 is depicted as one network for simplicity, it should be appreciated that according to one or more embodiments, the network 106 may comprise a plurality of interconnected networks, such as, for example, a service provider network, the Internet, a cellular network, corporate networks, or even home networks, or any of the types of networks mentioned above.

Data may be transmitted and received via network 106 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1 illustrates individual devices or components, it should be appreciated that there may be several of such devices to carry out the various exemplary embodiments. Users 102, 104 may communicate using any mobile or computing device, such as a laptop computer, a personal digital assistant, a smartphone, a smartwatch, smart glasses, other wearables or other computing devices capable of sending or receiving network signals. Customer devices may have an application installed.

Assistant Application 120 and Management Portal 110 may be communicatively coupled to various storage devices, such as databases, data stores, memory components, cloud storage, network based storage, etc. Storage devices may include any suitable data structure to maintain the information and allow access and retrieval of the information. For example, a database may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Storage devices may be any suitable storage device or devices. The storage may be local, remote, or a combination thereof and may further may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Database 152 may have back-up capability built-in. Communications with the storage devices may be over a network, such as network 106, or communications may involve a direct connection.

Having described an example of the hardware, software, and data that can be used to run the system, an example of the method will now be described. The method will be described primarily as an example in which a user downloads a software application (sometimes referred to as an "app") and uses it to perform reporting and/or other functionality. However, those skilled in the art will appreciate that the principles of the invention can be applied to related circumstances, such as where the entity providing the app is a business other than a financial institution, or where the financial institution app functionality is provided through a browser on the customer's mobile device rather than through a software application (app) downloaded to the customer's mobile device, and with purchases from various providers.

Figure 2:
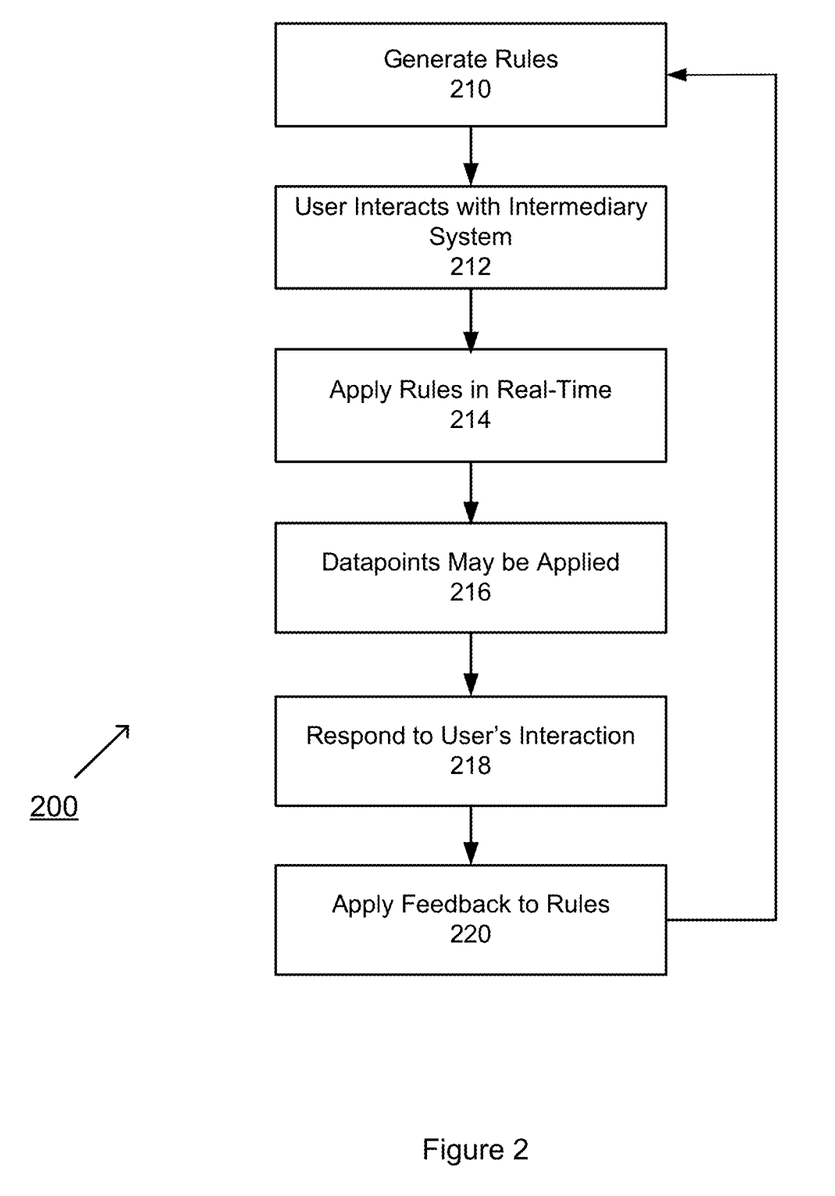
FIG. 2 is an exemplary flowchart of a method for implementing a technical intermediary tool, according to an embodiment of the present invention.

FIG. 2 is an exemplary flowchart of a method for implementing a technical intermediary tool, according to an embodiment of the present invention. At step 210, one or more rules may be generated via a Rules Portal or other interface. At step 212, the user may interact with an intermediary system that includes an intermediary tool. At step 214, the rules may be applied in real-time. At step 216, data points from internal and/or external sources may be applied. At step 218, the intermediary system may provide respond to the user's interaction. At step 220, the system may modify, refine and/or update the rules via feedback process. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, one or more rules may be generated via a Rules Portal or other interface. The rules, which may be part of a Rulepack, drives the logic in real-time while a user (e.g., specialist, analyst, etc.) is interacting with the system. For example, the user may input information for a credit advancement on a reporting system. Also, the data may be provided electronically via a data feed or other input.

At step 212, the user may interact with an intermediary system that includes an intermediary tool. The intermediary tool may be in communication with a third-party reporting system. For example, when a consumer information indicator is set to a series of values, the system may ensure that the current balance is blank, the amount past due is blank and original charge-off amount is blank. This may be based on the status of the loan, which may not be readily available on a current interface. The field may also dictate how bankruptcy rules are applied. There may be indicators that define the account as a bankruptcy account. This may trigger the system to apply a unique set of bankruptcy rules to the current data.

At step 214, the rules may be applied in real-time. The rules may be maintained as a Rulepack. For example, Rulepacks may include a mortgage banking Rulepack, a credit card services Rulepack. Through Rulepacks, the system may manage all product and/or service lines. An embodiment of the present invention may create Rulepacks to address a specific situation based on a product and/or user experience. For example, each rule pack may contain a series of pages, where each page may represent a screen which an employee (or user) may be working on during the amendment process. The page may contain a list of rules which are relevant to that page. When a user changes pages, then the rule pack page rules also change to reflect the new page/location the employee (or user) is working on.

At step 216, data points from internal and/or external sources may be applied. The rules may be based on current data points. Datapoints may represent elements on a page such as a textbox that an employee may enter data into during an amendment process. A datapoint may also be a reference to an external element such as a cell in a spreadsheet-type document or any other data container which may reside on a platform that is accessible to the employee or user. Datapoints may represent data that may be used to verify or validate the input information. In addition, the system may consider data points from other internal and external sources of data. This additional functionality provides the ability to validate information from a broad array of sources and applications. Exemplary data may include data that validates birthdate, charge-off date, late payments, bankruptcy status, etc. The data may also include data that provides supporting information for a client as well as historical actions concerning a loan or other product, and attributes of the loan or product.

At step 218, the intermediary system may provide respond to the user's interaction. The responses may be based on the Rule level, which may include Issue, Warning and Informational. The Rule level may be based on the type of error and/or other interaction data generated by the application.

At step 220, the system may modify, refine and/or update the rules via feedback process. An embodiment of the present invention may be directed to collecting rule violations, frequency of violations, and/or other metrics and factors. This information may be used as part of a feedback process to address common mistakes, errors and points of confusion for specialists and/or other users. The feedback process may address errors in real-time and further enable the system to make corrections in procedures and training processes as users interact with the system.

Figure 3:
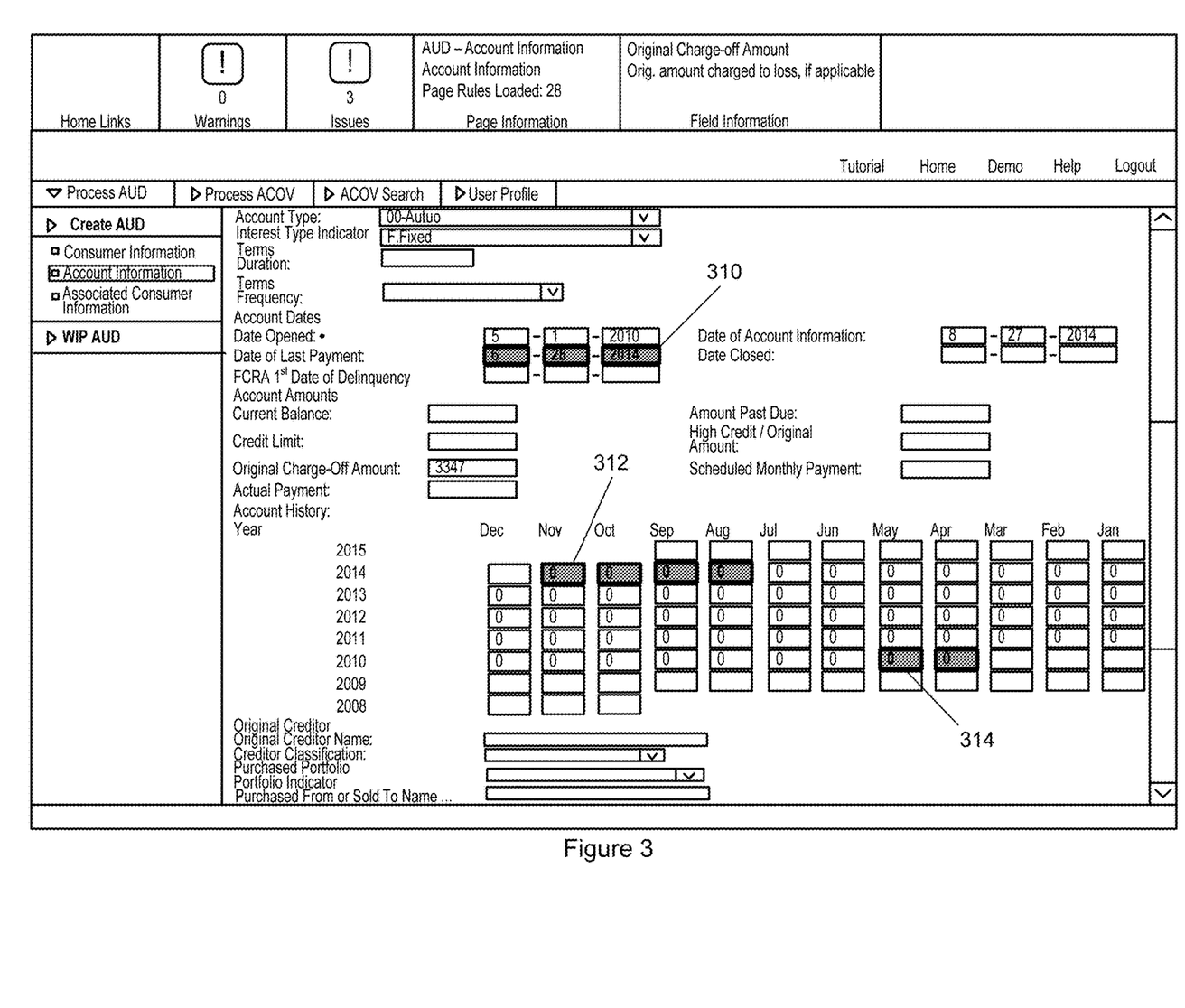
FIG. 3 illustrates an exemplary interactive interface, according to an embodiment of the present invention.

FIG. 3 illustrates an exemplary interactive interface, according to an embodiment of the present invention. The exemplary screenshots demonstrate how the intermediary tool may be used to increase the quality of data that is sent to the credit bureaus on behalf of customers.

For example, a specialist may communicate with a third party website to enter one or more credit amendments. As shown in FIG. 3, the intermediary tool identifies errors in real time. In this example, the exemplary amendment has three errors which will report incorrectly if the specialist were to submit this request. The system identifies and highlights the errors as they occur in real-time, as shown by as shown by 310, 312 and 314.

Figure 4:
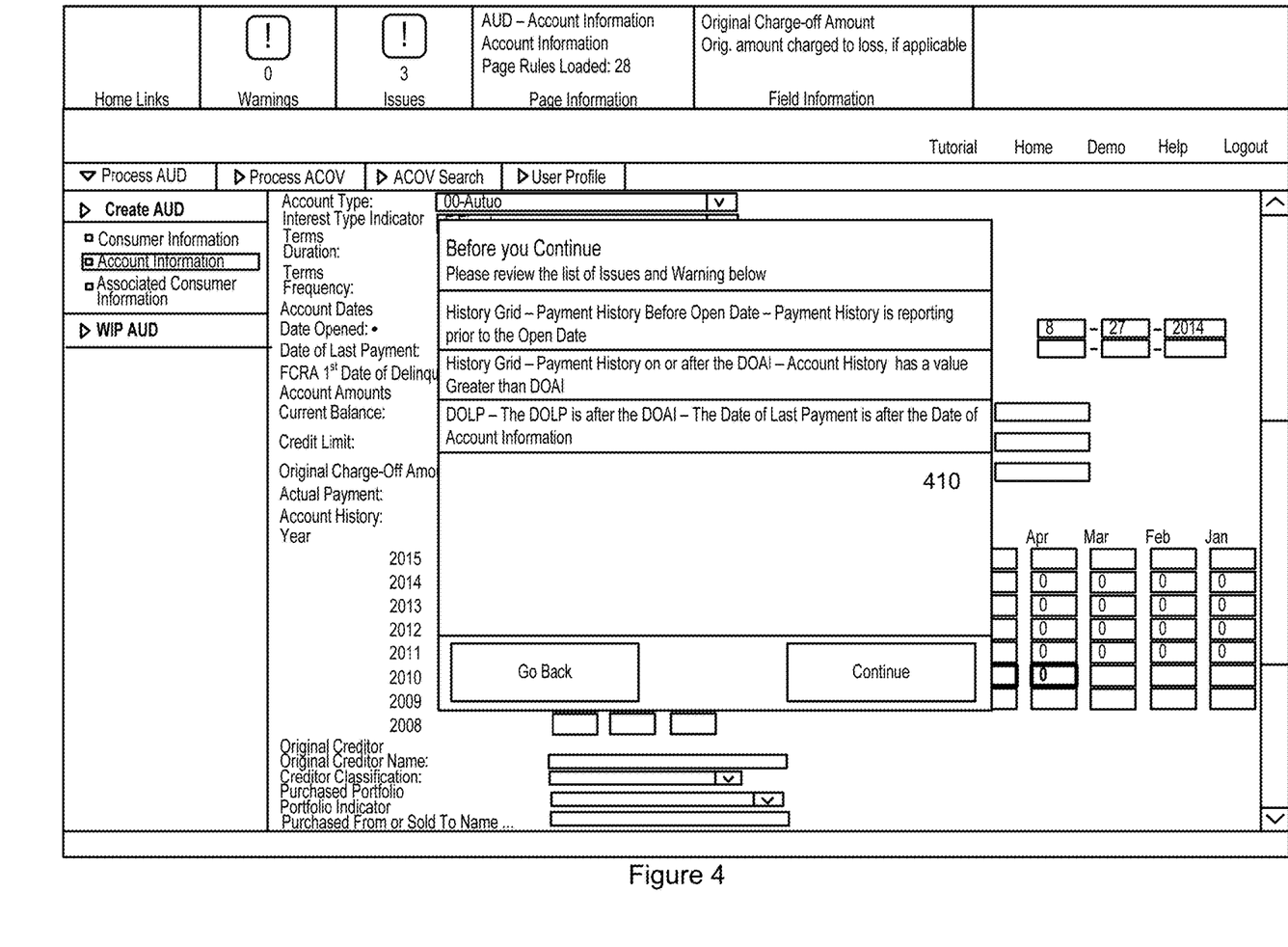
FIG. 4 illustrates an exemplary interactive interface, according to an embodiment of the present invention.

FIG. 4 illustrates an exemplary interactive interface, according to an embodiment of the present invention. If the specialist attempts to submit an amendment with data that violates the rules, a message relative to the rules violations may be displayed. As shown in FIG. 4, the message may provide details regarding the identified errors, as shown at 410. Interaction options to correct, address and/or acknowledge may be provided.

According to another embodiment of the present invention, the system may implement machine learning or artificial intelligence to identify possible correct answers and/or other rationale behind the errors. The system may then auto-correct the errors with a message identifying the error and correct answer. Also, if multiple correct answers are likely, the system may provide a drop-down menu or other manner of selection. In addition, if a likely answer is not available, the system may identify the error and allow the user to correct the error.

An embodiment of the present invention may be directed to utilization of data elements from different pages on a reporting website when a specialist is filling out an amendment. For example, the system may retain the previous page data elements in memory and use those as data points which may be used to develop new rules on each subsequent page.

An embodiment of the present invention may be directed to a plug-in mechanism that enables users to create custom links back to a system of record for a relative product. For example, the system may create rules and validations to ensure that the reporting during an amendment process is accurate and up-to-date as well as enabling the system to generate new rules that use the source system data elements as a new data point.

An embodiment of the present invention may be directed to creating new data elements to define a root cause and a source of the amendment which may be associated with a specific account, client and/or amendment. Data points may be generated on-the-fly to address root and source causes. The system may properly and accurately define why the system is performing these amendments which allows for the reduction in the need for amendments by addressing the source and/or root problems.

Figure 5:
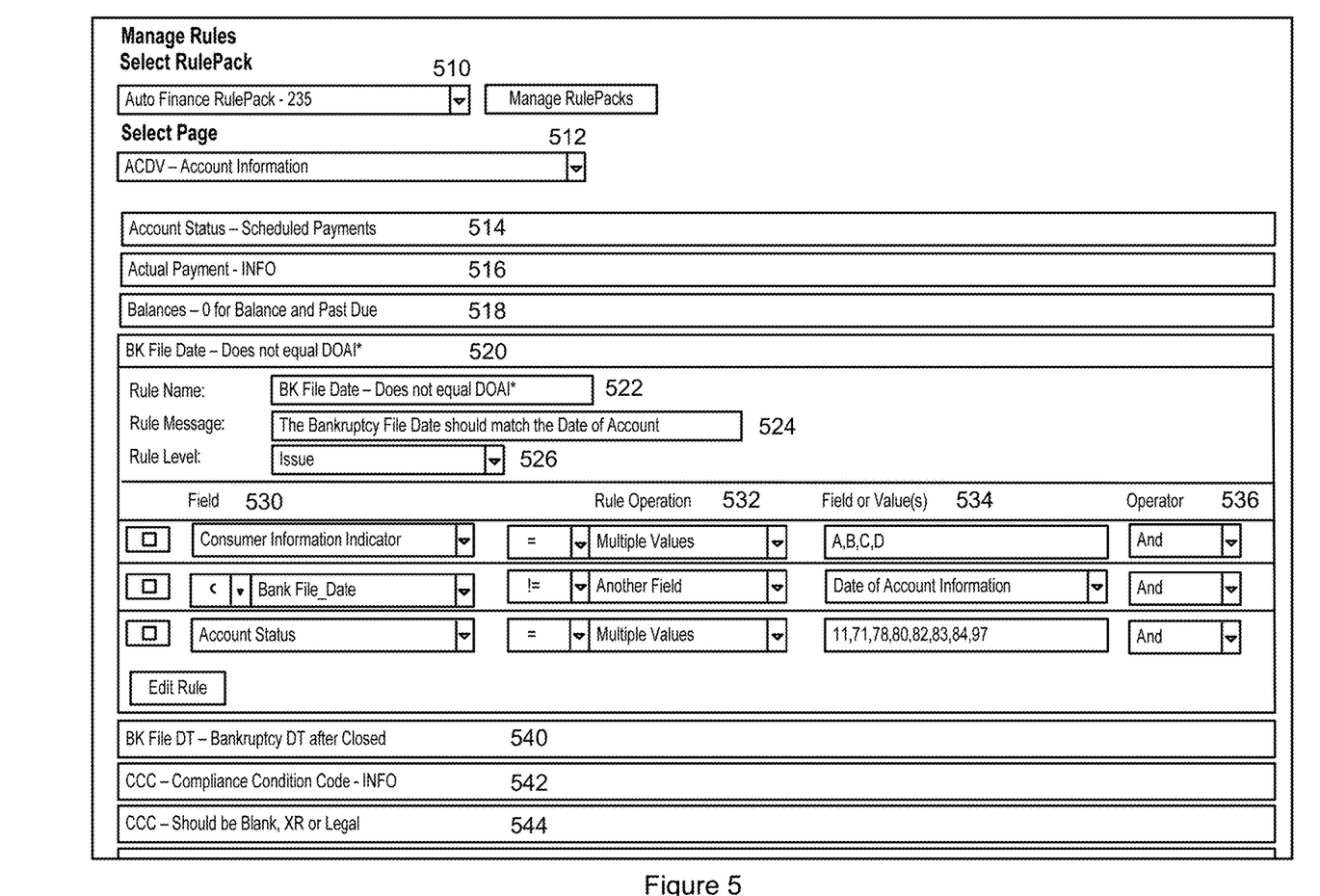
FIG. 5 is an exemplary illustration of a rules management interface, according to an embodiment of the present invention.

FIG. 5 is an exemplary illustration of a rules management interface, according to an embodiment of the present invention. For example, rules may be managed by a credit operations management team. Rules may be contained within Rulepacks so that each product line's specific business logic may be applied to the amendments being products for those products.

As shown in FIG. 5, the system may identify and implement various Rules Pack, which may be associated with a line of business, as shown at 510. The system may also identify a page. In this example, the page is Account information, as shown at 512.

Other information may include Account Status, at 514, Account Payment, at 516 and Balances, at 518. Rule details may be displayed for a specific rule, as selected by 520. Rule details may include Rule Name 522, Rule Message 524 and Rule Level 526. Other rules are displayed at 540, 542 and 544.

Additional details may include Field 530, Rule Operation 532, Field or Value at 534 and Operator 536. Rule operations may be structured so that a Rule pack manager may setup a single or multiple point evaluation against data points. For example, Field 530 may be an "Open Date" data point on a page, Rule Operation 532 may represent a "Greater Than" operation and Field 534 may be a "Close Date" field on the page. The rule would then read "If the Open Date is Greater than the Close Date." Once a rule meets the specified criteria, then the rule may be considered a violation and subsequent logic may be executed to notify the employee (or user, other recipient, etc.) of the violation. Operator 536 may be comprised of one or more selectable elements, "And" and "Or"; these operators allow for the grouping of the single line evaluations in case there are multiple stages of logic that would compose a single violation. Other operators may be implemented, depending on the complexity and/or specific application or use.

An embodiment of the present invention is directed to an intermediary tool that works with a third party website. According to another embodiment, the intermediary tool may be associated with the third party website, other variations and architectures may be realized.

Figure 6:
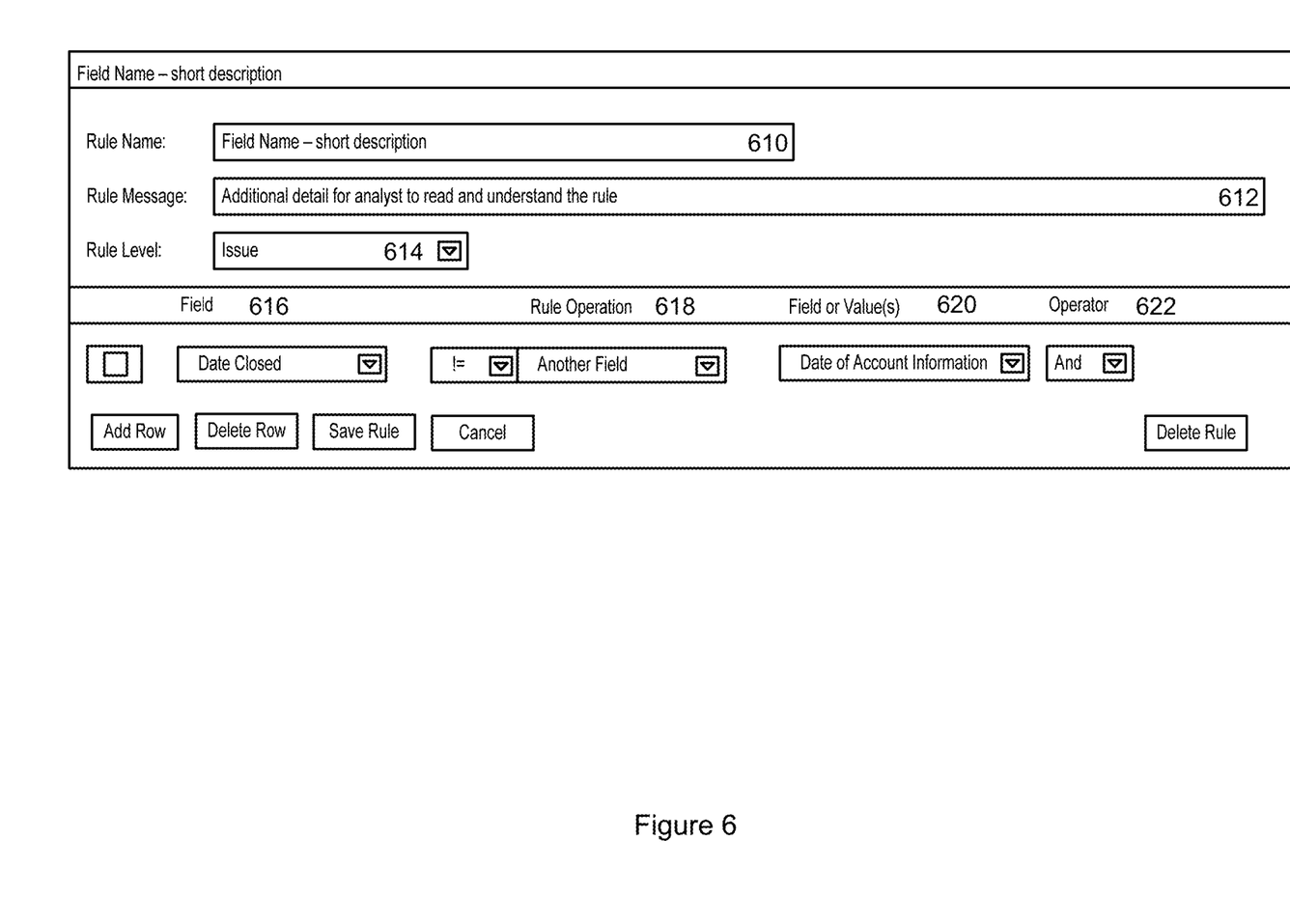
FIG. 6 is an exemplary illustration of a rules management interface, according to an embodiment of the present invention.

FIG. 6 is an exemplary illustration of a rules management interface, according to an embodiment of the present invention. A Rulepack may represent a set of validations that applies to specific business processing within the Application. Certain field selections and values entered may trigger an issue, warning or informational message to display with the intention of prompting the analyst to check the work and ensure accuracy. A user may perform various functions, including creating a Rulepack, adding a Rule, modifying a Rule, and deleting a Rule.

For example, a user may create a Rulepack for an identified group to use when processing disputes in the application of an embodiment of the present invention.

A user may also add a rule to create a new validation rule to be used in a selected Rulepack. The user may select an appropriate Rulepack and Page requiring a new rule. If the page has rules assigned currently, a list of the rules may be displayed on the page. The user may enter a Rule Name, at 610, and a Rule Message, at 612. This message may display in a rule violation interface when the identified scenario occurs.

The user may also identify a Rule Level, at 614. For example, Rule Levels may include Issue, Warning and Informational. In this example, Issue may be defined as data requiring correction. A Warning may indicate a problem with the data may exist. Informational may serve as a reminder note that may be added to the selected field once any value is entered. Other levels and variations may be applied. Also, various different levels may be applied to different scenarios within the Application. The user may build a new rule using field dropdowns and rule operators. The user may also define custom fields. As shown in FIG. 6, a dropdown menus may include Field 616, Rule Operation 618, Field or Value 620 and Operator 622. Other options and operators may be applied.

Figure 7:
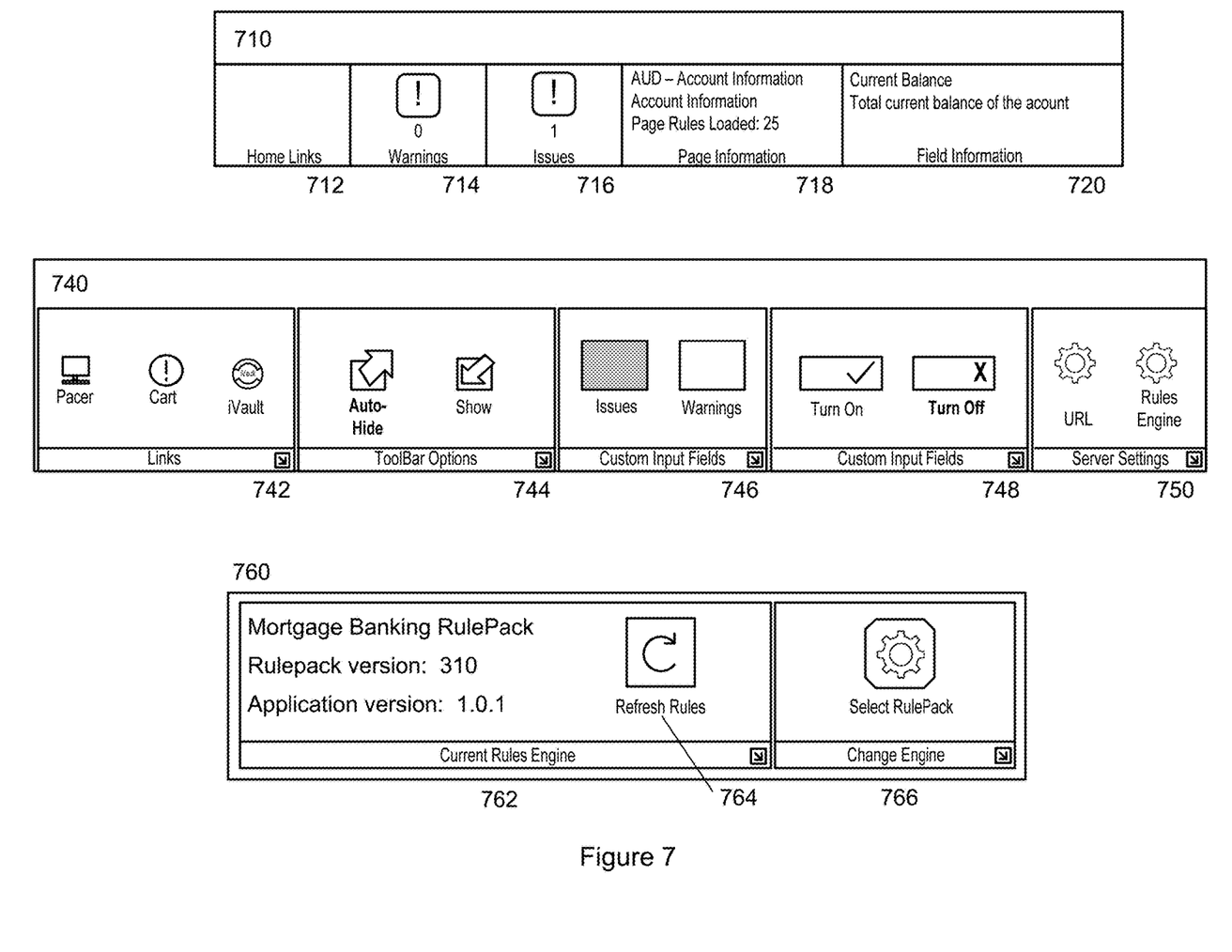
FIG. 7 is an exemplary illustration of an Assist Tabs, according to an embodiment of the present invention.

Also, the user may modify or delete an existing validation rule in a selected Rulepack. To modify a rule, the user may access the interface and make corresponding edits and changes FIG. 7 is an exemplary illustration of an Assist Tabs, according to an embodiment of the present invention. According to an exemplary illustration, the Home tab 710 may include various features. Home Link 712 returns the analyst to a third party login page. Warnings 714 indicated the possibility of a correction or verification needed, noting exceptions may apply. For example, the number of warnings may be displayed below the blue (by default) icon in the task bar. Issues 716 indicates a correction or verification is needed. For example, the number of issues is displayed below the red (by default) icon in the task bar. Page Information 718 displays the number of rules assigned and active on the page. Field Information 720 displays description of field selected based on information entered for the field in the management tool.

The Tools and Settings Tab 740 includes links to frequently used applications and websites, preference options for the tool bar and validation colors and the ability to process with or without custom fields. Links 742 includes quick links to Pacer, Cart and iVault. Clicking each icon may open a new browser window and direct the analyst to the login page of the selected app or website. ToolBar Options 744 provides the option to Auto-Hide the tool bar; if Auto-Hide is selected, analysts will need to click the 'Tools and Setting' link to see the tab information. Textbox Colors 746 provides the option to change the color fields will highlight when a rule is violated causing an issue or warning. Custom Input Fields 748 provides an option to process with or without the use of custom fields on the page. Server Settings 750 provides a hidden option users can activate to change the servers the application communicates to in order to manage rules and navigate to the proper website. According to an exemplary application, to view, a user may right click four times in a blank space of the tool bar and click "Show Admin Tools." Two icons may appear for URL and Rules Engine, both set to default URL and/or Web API path.

The About tab 760 displays information about the current Rulepack and application version in use providing the options to refresh rules and select a different Rulepack. Current Rules Engine 762 displays the name of the Rulepack in use as well as the Rulepack and Application versions applied. An icon 764, Refresh Rules, is displayed to the right of the information; when clicked, the application may refresh and apply new/edited rules from the Rulepack if any are available. Change Engine 766 displays an icon titled Select Rulepack. When clicked, a pop up window may list the available Rulepacks giving the analysts an option to select and apply a different one.

Figure 8:
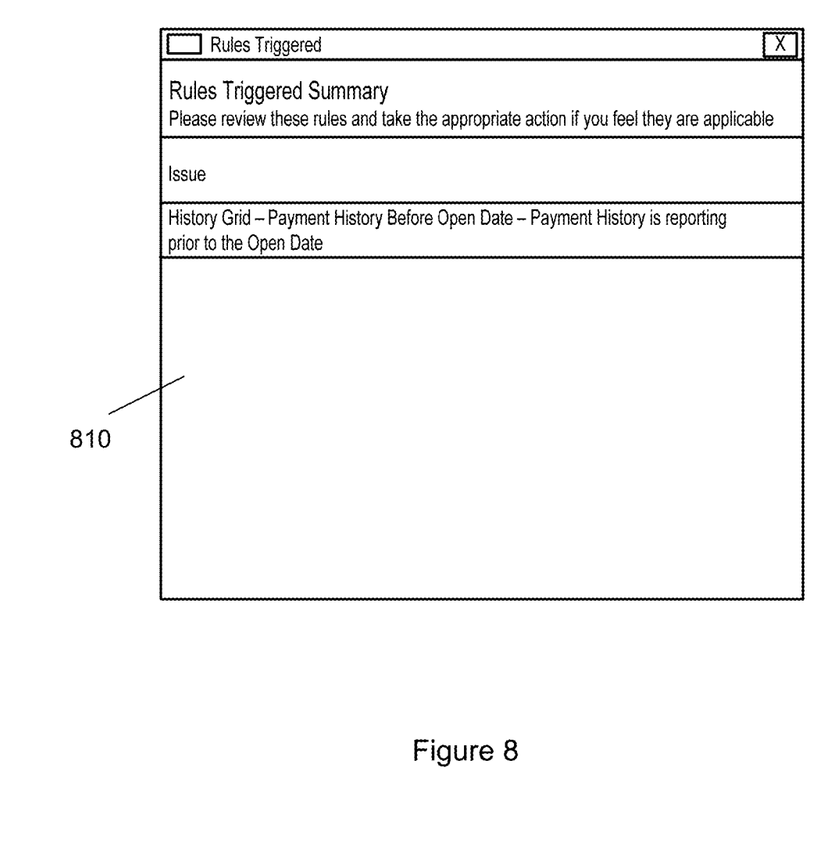
FIG. 8 is an exemplary illustration of an interactive display, according to an embodiment of the present invention.

FIG. 8 is an exemplary illustration of an interactive display, according to an embodiment of the present invention. As shown in FIG. 8, an exemplary pop up is displayed when clicking on the warnings or issues icon. The process validations represent the rules validating data as ACDVs and AUDs are being processed. Validation checks may appear in the form of a warning, issue or information as defined in the Home tab section and may result in fields highlighting or icons with a mouse over feature displaying next to fields.

As shown in FIG. 8, if any fields are still highlighted when attempting to move to the next page, a pop up window 810 with the warning and/or issue information will appear.

Based on review and validation done, click 'Go Back' to remain on the page and make updates or click 'Continue' to move on to the next page. Depending on the interaction and data provided, other messages and information may be displayed. The messages may be provided in various formats, including graphics, animation, videos, links to other pages, systems and data.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical home or personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A computer implemented system that observes a user's actions in real-time and provides error checking and business intelligence; comprising:
   an intermediary system comprising an interface for user interaction and an intermediary tool that is applied to Online Solution for Complete and Accurate Reporting (e-OSCAR), a third-party reporting system that processes credit disputes;
   a rules engine comprising a memory component that stores rules data specific to credit businesses; and
   a computer processor coupled to the intermediary system and rules engine; the computer processor programmed to:
   generate, via the rules engine, a rule pack specific to a line of business including one or more of credit card services and mortgage banking the rule pack comprising a series of pages, each page representing a screen that the user will work on during an information amendment process through e-OSCAR and containing one or more rules addressing the information that the user will enter on the screen;
   observe, via the interface of the intermediary system, one or more user actions in real-time comprising entry of information into one or more interactive elements on each of the screens that the user will work on during the information amendment process through e-OSCAR;
   apply one or more datapoints to the intermediary system, the one or more datapoints comprising data that is used to validate the observed entry of information into the one or more interactive elements on each of the screens that the user will work on during the information amendment process through e-OSCAR;
   apply in real-time, via the rules engine, the rule pack in response to the one or more datapoints and the observed one or more user actions, to update the interface;
   automatically identify, via the rules engine, at least one error in the observed entry of information into one or more interactive elements on each of the screens that the user will work on during the information amendment process through e-OSCAR;
   respond, via the intermediary system, to the identified at least one error based on a rule level defined by an error type for the identified at least one error, the rule level comprising one or more of information, an issue notification, and a warning, the response comprising a message displayed on the interface; and
   update one or more rules in the rules engine based on feedback about the identified one or more errors as well as a frequency of the identified one or more errors.

2. The system of claim 1, wherein the rules pack comprises: a mortgage rule pack, a credit card rule pack, an auto rule pack and a student loans rule pack.

3. The system of claim 1, wherein the third party reporting system transmits reporting data to one or more credit bureaus.

4. The system of claim 1, wherein each rule comprises a rule name, rule message and rule level.

5. The system of claim 1, wherein the rule level comprises a plurality of levels, where a first level represents an issue requiring correction; a second level represents a warning that indicates that a problem may exist; and a third level represents informational reminder.

6. The system of claim 1, wherein each rule comprises a field, rule operation, field or value and operator.

7. The system of claim 1, wherein the rules engine enables rules to be modified, added and deleted.

8. The system of claim 1, wherein the rules are based on data points from internal and external sources.

9. The system of claim 1, wherein the computer processor is further programmed to apply a feedback loop to update one or more rules based on user interaction data.

10. The system of claim 1, wherein the third-party reporting system that processes automated credit dispute verifications and automated universal data forms.

11. A computer implemented method that observes a user's actions in real-time and provides error checking and business intelligence; the method comprising the steps of:

generating, via a rules engine, a rule pack specific to a line of business including one or more of credit card services and mortgage banking the rule pack comprising a series of pages, each page representing a screen that the user will work on during an information amendment process through e-OSCAR and containing one or more rules addressing the information that the user will enter on the screen;

observing, via an interface of an intermediary system, one or more user actions in real-time comprising entry of information into one or more interactive elements on each of the screens that the user will work on during the information amendment process through e-OSCAR;

applying one or more datapoints to the intermediary system, the one or more datapoints comprising data that is used to validate the observed entry of information into the one or more interactive elements on each of the screens that the user will work on during the information amendment process through e-OSCAR;

applying in real-time, via the rules engine, the rule pack in response to the one or more datapoints and the observed one or more user actions, to update the interface;

automatically identifying, via the rules engine, at least one error in the observed entry of information into one or more interactive elements on each of the screens that the user will work on during the information amendment process through e-OSCAR;

responding, via the intermediary system, to the identified at least one error based on a rule level defined by an error type for the identified at least one error, the rule level comprising one or more of information, an issue notification, and a warning, the response comprising a message displayed on the interface; and updating one or more rules in the rules engine based on feedback about the identified one or more errors as well as a frequency of the identified one or more errors.

12. The method of claim 11, wherein the rules pack comprises: a mortgage rule pack, a credit card rule pack, an auto rule pack and a student loans rule pack.

13. The method of claim 11, wherein the third party reporting system transmit reporting data to one or more credit bureaus.

14. The method of claim 11, wherein each rule comprises a rule name, rule message and rule level.

15. The method of claim 11, wherein the rule level comprises a plurality of levels, where a first level represents an issue requiring correction; a second level represents a warning that indicates that a problem may exist; and a third level represents informational reminder.

16. The method of claim 11, wherein each rule comprises a field, rule operation, field or value and operator.

17. The method of claim 11, wherein the rules engine enables rules to be modified, added and deleted.

18. The method of claim 11, wherein the rules are based on data points from internal and external sources.

19. The method of claim 11, wherein the computer processor is further programmed to apply a feedback loop to update one or more rules based on user interaction data.

20. The method of claim 11, wherein the third-party reporting system that processes automated credit dispute verifications and automated universal data forms.

* * * * *